C. O. F. HELLSTROM.
DETACHABLE BUTTON.
APPLICATION FILED JULY 15, 1914.
1,239,104.
Patented Sept. 4, 1917.
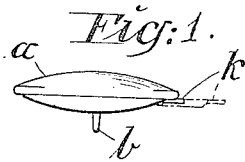
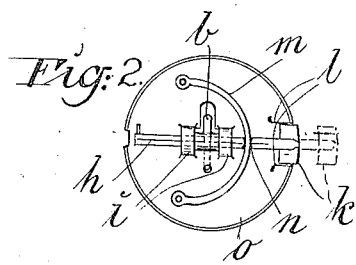
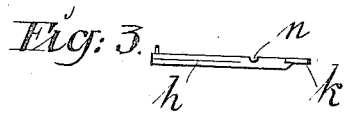
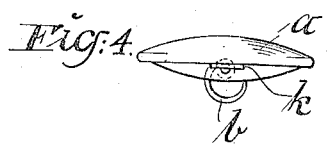
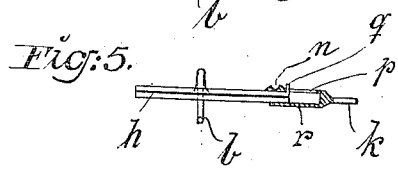
WITNESSES
INVENTOR
C. O. F. HELLSTRÖM
BY
ATTORNEY

UNITED STATES PATENT OFFICE.

CARL OSKAR FRIDOLF HELLSTRÖM, OF STOCKHOLM, SWEDEN.

DETACHABLE BUTTON.

1,239,104.           Specification of Letters Patent.       Patented Sept. 4, 1917.

Application filed July 15, 1914. Serial No. 851,111.

*To all whom it may concern:*

Be it known that I, CARL OSKAR FRIDOLF HELLSTRÖM, a subject of the King of Sweden, and resident of Rosenlundsgatan 30B, Stockholm, in the Kingdom of Sweden, have invented certain new and useful Improvements in Detachable Buttons, of which the following is a specification, reference being had therein to the accompanying drawing.

The present invention relates to improvements in detachable buttons that are provided with a fastening device by means of which they can be readily attached to a garment or the like.

I am aware of the fact that several different forms of construction of buttons of the above type have been proposed but, as far as I know, no one of the same has been extensively used in practice. This is due to the fact that the fastening means have been difficult to operate and that no or bad locking devices have been provided for the same.

My present invention now remedies for such inconvenience by the fact that the fastening device is connected with a shaft rotatively mounted on the button, said shaft being adapted to be operated by means of a suitable key or handle when the button is to be fastened or removed and to be locked by the same when the fastening means occupies its attaching position.

According to a practical form of construction said key or handle is made in one piece with the shaft, said shaft being mounted in its bearings in such manner that it can be displaced longitudinally, and when the shaft has been displaced to its normal position the said handle hereby acts as a locking device for the shaft. In order to prevent unintentional displacements of the shaft a spring or other frictional device may, if necessary, be provided to act upon the shaft.

According to another form of construction the key is arranged to slide on the shaft in which case the latter is also rotatively mounted in its bearings without being able to slide in the same. Other features of the present invention will be clear from the following description.

The invention is illustrated in the accompanying drawing, in which Figure 1 is a side view of a detachable button. Fig. 2 is a plan view showing the lower side of the button. Fig. 3 shows the shaft separately. Fig. 4 is a side view of the button at right angles to the position shown in Fig. 1. Fig. 5 shows a modified form of the shaft with the key arranged to slide on the same.

In Figs. 1–5, $a$ designates the button, $b$ is the fastening means, preferably a hook, $h$ is the shaft and $i, i$ are the bearings in which the shaft can rotate and be displaced longitudinally. The hook $b$ is held in its position between the bearings by the shaft which is adapted to slide in both the hook and the bearings. The shaft, however, has a square or other suitable section, so that the hook will be caused to rotate with the shaft in any position of the latter. One end of the shaft is provided with a plate or wing $k$ forming the handle by means of which the shaft can be rotated. $l$ is a slot provided in the button or in the back plate $o$ of the same, the wing $k$ being introduced into said slot when the hook occupies its closed position. The shaft $h$ is prevented from unintentional displacement by a spring $m$ adapted to engage a slot $n$ provided on the shaft $h$.

This button is fastened as follows: If the shaft $h$ occupies the position shown in full lines, Fig. 2, it is first displaced so as to occupy the position shown in dotted lines, Fig. 2. Then the shaft is by means of the handle $k$ turned so as to open the hook $b$. Then the handle is turned in the opposite direction so as to force the hook through the fabric and when the hook has come to its closed position the shaft is displaced longitudinally so as to occupy again the position shown in full lines, Fig. 2. In this position the wing $k$ having been introduced into the slot $l$ acts as a locking device preventing the shaft from being rotated unintentionally. In this position the spring $m$ engages the groove $n$ thereby preventing the shaft from being displaced unintentionally.

Instead of being slidable in its bearings the shaft may also be so mounted that it cannot slide. In this case which is illustrated in Fig. 5 the handle $k$ is adapted to be displaced on the shaft $h$. The handle $k$ is in this case attached to a shell $r$ which can slide but not rotate on the shaft. A stop pin $q$ being guided by a slot $p$ provided in the sleeve prevents the sleeve from being removed from the shaft. The slot $n$ for receiving the spring $m$ is in this case arranged in the shell. This shaft $h$ with its rotating and locking device $k$ is operated in the same manner as that described in connection with Figs. 2 and 3.

Having now described my invention, what I claim as new and desire to secure by Letters Patent is:

1. In detachable buttons, the combination of a shaft rotatively mounted on the button, bearings for the shaft, said shaft being adapted to slide in said bearings, fastening means on said shaft, which can slide on and rotate with the shaft, a handle provided on the shaft for rotating the same and a slot in the button for receiving said handle on displacing the shaft thereby locking the latter when the fastening means occupies its attaching position, substantially as described.

2. In detachable buttons, the combination of a shaft rotatively mounted on the button, bearings for the shaft, said shaft being adapted to slide in said bearings, fastening means on said shaft which can slide on and rotate with the shaft, a handle provided on the shaft for rotating the same, a slot in the button for receiving said handle on displacing the shaft; thereby preventing the shaft from being rotated, when the fastening means occupies its attaching position, and a retaining means for preventing the shaft from being unintentionally displaced, substantially as described and for the purpose set forth.

In witness whereof, I have hereunto signed my name in the presence of two subscribing witnesses.

CARL OSKAR FRIDOLF HELLSTRÖM.

Witnesses:
   GUSTAF ISFALL,
   GRETA PRICE.

Copies of this patent may be obtained for five cents each, by addressing the "Commissioner of Patents, Washington, D. C."